United States Patent [19]

Huang

[11] Patent Number: 5,351,980
[45] Date of Patent: Oct. 4, 1994

[54] JOINT ASSEMBLY FOR A BICYCLE SADDLE

[75] Inventor: Andrew Huang, Taichung Hsien, Taiwan

[73] Assignee: Giant Manufacturing Co., Ltd., Taichung Hsien, Taiwan

[21] Appl. No.: 180,627

[22] Filed: Jan. 13, 1994

[51] Int. Cl.⁵ .............................................. B62K 19/36
[52] U.S. Cl. .................................. 280/281.1; 280/287
[58] Field of Search .................. 280/281.1, 274, 288.2, 280/288.3, 288.4, 287, 278

[56] References Cited

U.S. PATENT DOCUMENTS 4,230,332  10/1980  Porsche ............................ 280/288.3
5,054,802  10/1991  Smith ................................ 280/288.3

FOREIGN PATENT DOCUMENTS 2248807  4/1992  United Kingdom ............. 280/281.1

Primary Examiner—Margaret A. Focarino
Assistant Examiner—Kevin Hurley
Attorney, Agent, or Firm—Handal & Morofsky

[57] ABSTRACT

A joint assembly adjusts the height of a bicycle saddle and includes an elongated seat tube member, a joint member made of a carbon-fiber composite material, a seat post, and a hoop member. The joint member has an upper connecting portion, a lower connecting portion, and a longitudinal receiving chamber formed through the joint member from the upper connecting portion to the lower connecting portion. The upper connecting portion has a plurality of open-ended slots formed therethrough. Each adjacent pair of the open-ended slots define a flexible plate therebetween. The seat tube member is inserted fittingly into the receiving chamber and has a plurality of open-ended slots aligned with the open-ended slots of the joint member, and a shoulder portion which abuts against the bottom surface of the lower connecting portion of the joint member. The seat post extends downward from the bicycle saddle to engage movably the seat tube member. The hoop member is sleeved on the upper connecting portion of the joint member so as to lock the seat post on the joint member.

2 Claims, 3 Drawing Sheets

JOINT ASSEMBLY FOR A BICYCLE SADDLE

BACKGROUND OF THE INVENTION

1. Field of the Invention

This invention relates to a joint assembly for a bicycle saddle, more particularly to a joint assembly which has a carbon-fiber composite joint member that is easy to manufacture and that can clamp tightly the seat post of a bicycle therein.

2. Description of the Related Art

The improvement of this invention is directed to a conventional joint assembly which is used for adjusting the height of a bicycle saddle. The joint assembly includes an elongated seat tube member, a joint member which is made of metal and which is sleeved on the seat tube member, a seat post which is inserted into the joint member, and a hoop member which is sleeved on the joint member. The joint member has a lower connecting portion sleeved on and adhered to the seat tube member, and an upper connecting portion with a plurality of open-ended slots that are formed through the upper end of the wall thereof. Each adjacent pair of the open-ended slots define a flexible plate therebetween. The seat post extends downward from the bottom side of the bicycle saddle to engage movably the upper connecting portion of the joint member. The hoop member is sleeved on the upper connecting portion of the joint member and locks releasably the seat post on the joint member by means of an adjusting bolt so as to position the seat post at a predetermined location, thereby adjusting the height of the bicycle saddle.

The drawbacks of the conventional joint assembly are as follows:

1. The joint member, which is made of metal, increases the weight of the bicycle when the bicycle uses the conventional joint assembly.

2. The bicycle saddle cannot be effectively positioned on the conventional joint assembly only by means of the upper connecting portion of the joint member which clamps the seat post.

3. To combine the parts of the conventional joint assembly together, the joint member has to have a series of machining works so as to obtain desired upper and lower connecting portions which can be respectively and fittingly sleeved on the seat post and the seat tube member. However, the machining works require additional time and money, thereby increasing the manufacturing cost.

SUMMARY OF THIS INVENTION

The main objective of this invention is to provide a joint assembly which has a light weight joint member that is made of a carbon-fiber composite material and that can be manufactured easily.

Another objective of this invention is to provide a joint assembly with a joint member that can clamp tightly the seat post of a bicycle saddle.

According to this invention, a joint assembly is used for adjusting the height of a bicycle saddle and includes an elongated seat tube member, a joint member which is made of a carbon-fiber composite material, a seat post, and a hoop member.

The joint member is a tubular body which is adapted to interconnect the crossbar and the seat stay of a bicycle and which has an upper connecting portion, a lower connecting portion, and a longitudinal receiving chamber formed through the joint member from the upper connecting portion to the lower connecting portion. The upper connecting portion of the joint member has a plurality of open-ended slots formed through the upper end of the wall thereof. Each adjacent pair of the open-ended slots define a flexible plate therebetween. The seat tube member is inserted fittingly into the receiving chamber of the joint member and has a plurality of open-ended slots which are formed through the upper end of the wall of the seat tube member and which are aligned with the open-ended slots of the joint member, and a shoulder portion which abuts against the bottom surface of the lower connecting portion of the joint member. The seat post extends downward from the bottom side of the bicycle saddle to engage movably the seat tube member. The hoop member is sleeved on the upper connecting portion of the joint member so as to lock the seat post on the joint member.

BRIEF DESCRIPTION OF THE DRAWING

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
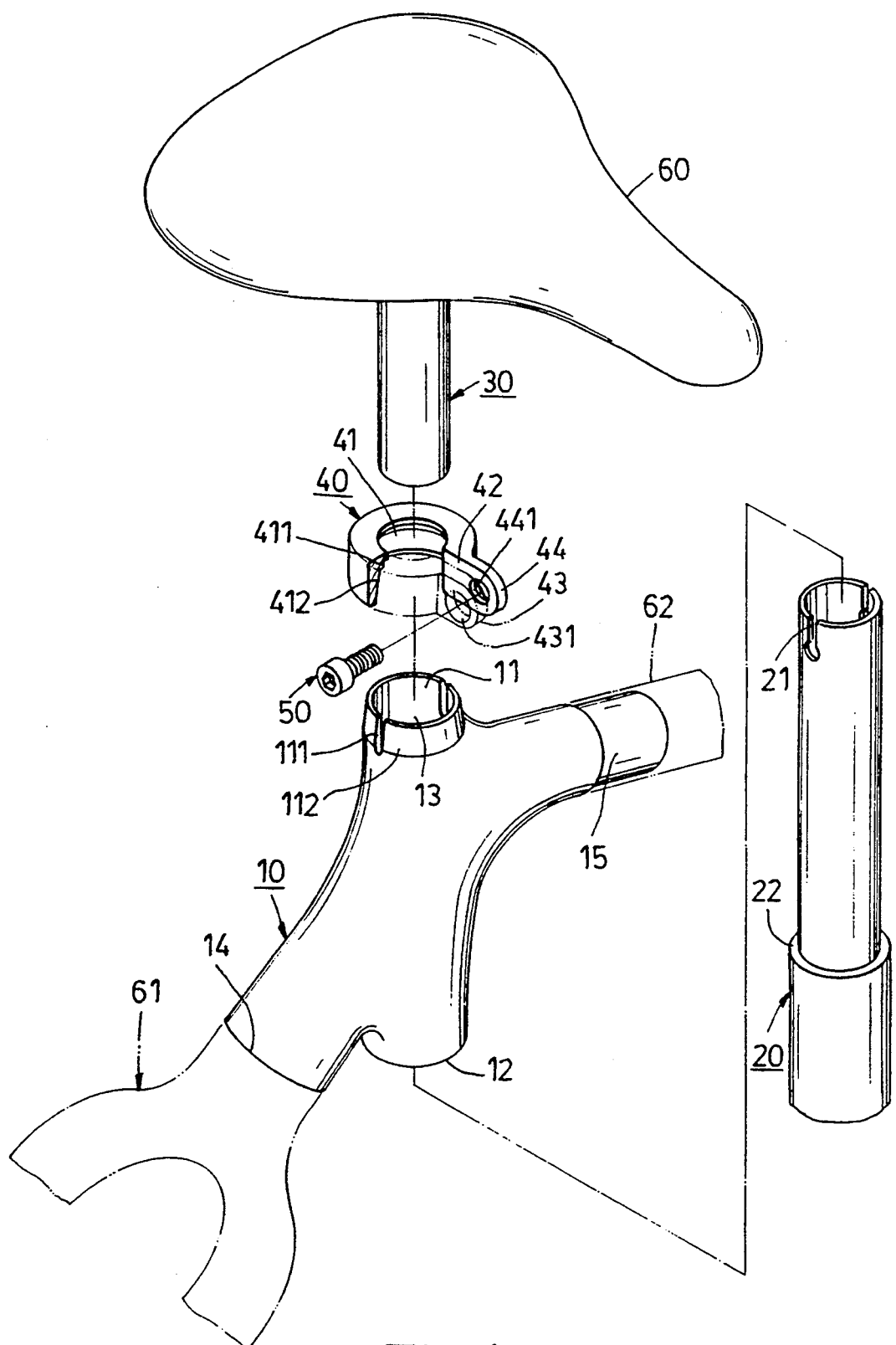
FIG. 1 is an exploded view showing the preferred embodiment of a joint assembly which has a seat post used for supporting a bicycle saddle in accordance with this invention.
Figure 2:
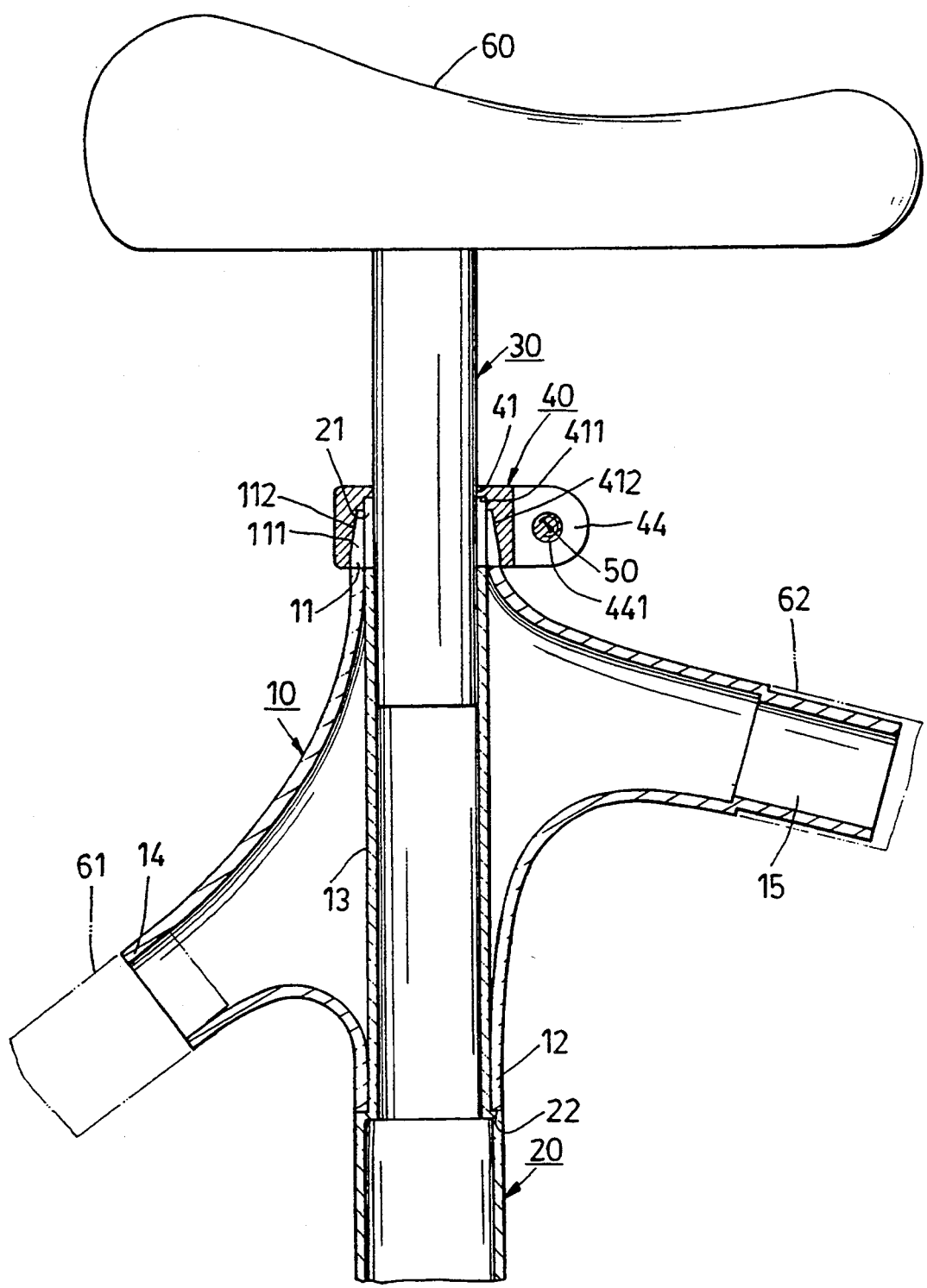
FIG. 2 is a sectional view illustrating the seat post when inserted into the joint member of the joint assembly of this invention.

Referring to FIGS. 1 and 2, the joint assembly of the preferred embodiment of this invention is used for adjusting the height of a bicycle saddle 60 and includes a joint member 10 that is made of a carbon-fiber composite material, an elongated seat tube member 20 that is made of the carbon-fiber composite material and that is inserted fittingly into the joint member 10, a seat post 30 that is engaged movably within the joint member 10, and a hoop member 40 that is sleeved on the joint member 10.

The joint member 10 is a tubular body which has an upper connecting portion 11, a lower connecting portion 12, a front connecting portion 15 that is sleeved tightly on the crossbar 62 of a bicycle, a rear connecting portion 14 that is sleeved tightly on the seat stay 61 of the bicycle, and a longitudinal receiving chamber 13 formed through the joint member 10 from the upper connecting portion 11 to the lower connecting portion 12. The upper connecting portion 11 of the joint member 10 has a pair of aligned open-ended slots 111 formed through the upper end of the wall thereof. The open-ended slots 111 define two flexible plates 112 therebetween. The upper connecting portion 11 further has a top end, a bottom end which is connected securely to the upper section of the joint member 10, and an outer diameter which decreases gradually from the bottom end to the top end of the upper connecting portion 11 so as to define a tapered outer wall on the upper connecting portion 11.

Figure 3:
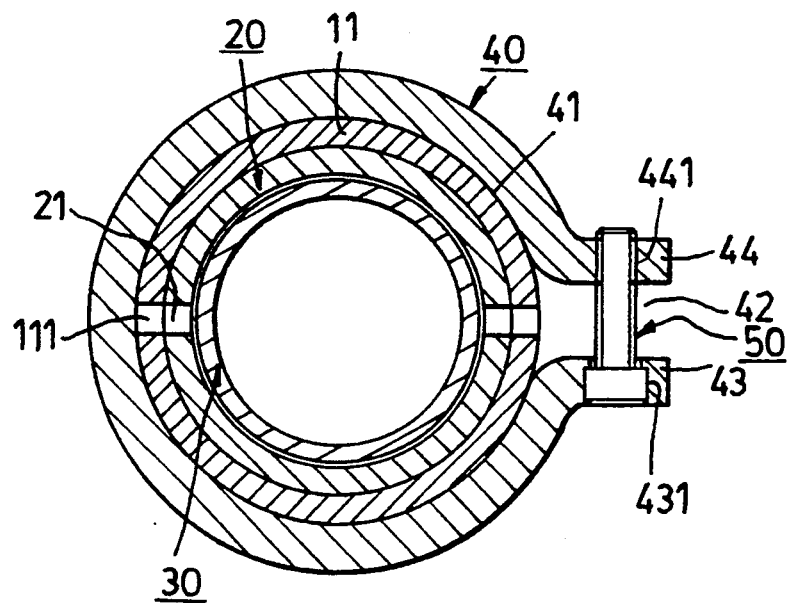
FIG. 3 is a schematic view illustrating the joint member of the joint assembly when not clamping tightly the seat post of the joint assembly according to this invention.

The seat tube member 20 is inserted fittingly into the receiving chamber 13 of the joint member 10, and has a pair of aligned open-ended slots 21 and a shoulder portion 22. As shown in FIG. 3, the aligned open-ended slots 21 are formed through the upper end of the wall of the seat tube member 20 and are respectively aligned with the open-ended slots 111 of the joint member 10. The shoulder portion 22 abuts against the bottom surface of the lower connecting portion 12 of the joint member 10. The top end of the seat tube member 20 protrudes from the top end of the upper connecting portion 11 of the joint member 10.

The seat post 30 extends downward from the bottom side of the bicycle saddle 60 to be engaged movably within the seat tube member 20.

Figure 4:
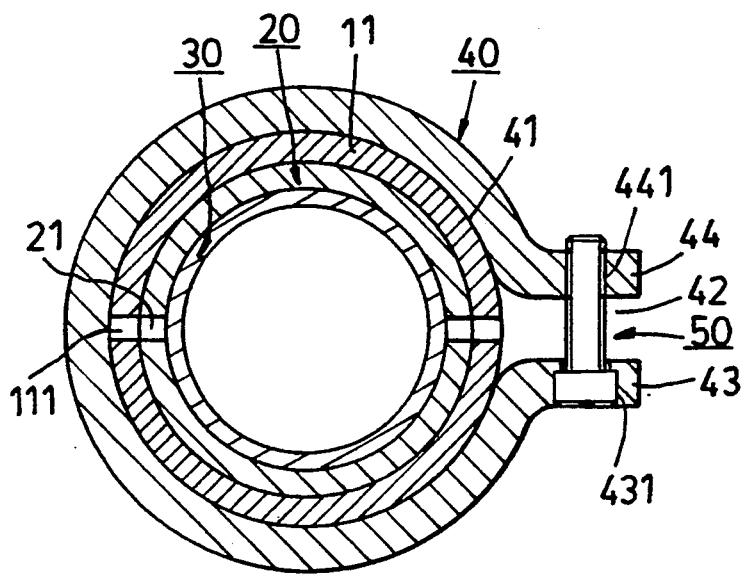
FIG. 4 is a schematic view illustrating the joint member of the joint assembly when clamping tightly the seat post of the joint assembly in accordance with this invention.

The hoop member 40 has a receiving space 41 to accept the seat post 30 therein, and two parallel lugs 43, 44 that are spaced apart from each other at a distance so as to define a gap 42 therebetween. The lug 43 has a hole 431 formed therethrough. The lug 44 has a threaded hole 441 formed therethrough and aligned with the hole 431 of the lug 43. The gap 42 is communicated with the receiving space 41. The hoop member 40 has an inner diameter which decreases gradually from the bottom end to the top end thereof so as to define a tapered inner wall 412 at the receiving space 41 and a shoulder portion 411 above the tapered inner wall 412. Accordingly, the hoop member 40 is sleeved on the joint member 10 in such a manner that the tapered inner wall 412 abuts against the tapered outer wall of the upper connecting portion 11. The shoulder portion 411 abuts against the top end surface of the seat tube member 20. An adjusting bolt 50 extends through the hole 431 to engage the hole 441 so as to loosen and tighten the hoop member 40, as shown in FIGS. 3 and 4.

Again, referring to FIGS. 3 and 4, when the adjusting bolt 50 isn't tightened completely, the gap 42 has a larger distance so that the seat tube member 20 does not tightly clamp the seat post 30, as shown in FIG. 3. Then, the seat post 30 is capable of being adjusted to a desired location. When the adjusting bolt 50 is tightened completely in order to reduce the distance of the gap 42, the seat tube member 20 clamps tightly the seat post 30, as shown in FIG. 4. Therefore, the seat post 30 is capable of being positioned at a predetermined location.

It is understood that the joint member 10 and the seat tube member 20, which are made of carbon-fiber composite material, can achieve the purpose of decreasing the weight of the bicycle and can be easily adhered to each other by glue. Because the top end of the seat tube member 20 extends from the receiving chamber 13 of the joint member 10 so as to be sleeved on the seat post 30, the joint member 10 and the seat tube member 20 can clamp the seat post 30 effectively.

With this invention thus explained, it is apparent that numerous modifications and variations can be made without departing from the scope and spirit of this invention. It is therefore intended that this invention be limited only as indicated in the appended claims.

I claim:

1. A joint assembly for a bicycle saddle, said joint assembly including an elongated seat tube member, a joint member having a lower connecting portion which is sleeved on and adhered to said seat tube member and an upper connecting portion which has a plurality of open-ended slots that are formed through an upper end of a wall thereof and a plurality of flexible plates that are respectively defined between each adjacent pair of said open-ended slots, a seat post extending downward from a bottom side of said bicycle saddle to engage movably said upper connecting portion of said joint member, and a hoop member being sleeved on said upper connecting portion of said joint member and locking said seat post on said joint member, wherein the improvement comprises:

said joint member being made of a carbon-fiber composite material and being a tubular body which is adapted to interconnect a crossbar and a seat stay of a bicycle and which has a longitudinal receiving chamber formed through said joint member from said upper connecting portion to said lower connecting portion; and said seat tube member being inserted fittingly into said receiving chamber of said joint member and having a plurality of open-ended slots formed through an upper end of a wall of said seat tube member and aligned with said open-ended slots of said joint member, and a shoulder portion abutting against a bottom surface of said lower connecting portion of said joint member.

2. A joint assembly for a bicycle saddle as claimed in claim 1, wherein said upper connecting portion of said joint member has a top end, a bottom end connected securely to said upper section of said joint member, and an outer diameter which decreases gradually from said bottom end to said top end of said upper connecting portion.

* * * * *